G. V. BLACK.
Assignor by mesne assignments to SAMUEL S. WHITE.
DENTAL DRILLS.
No. 7,452. Reissued Jan. 2, 1877.
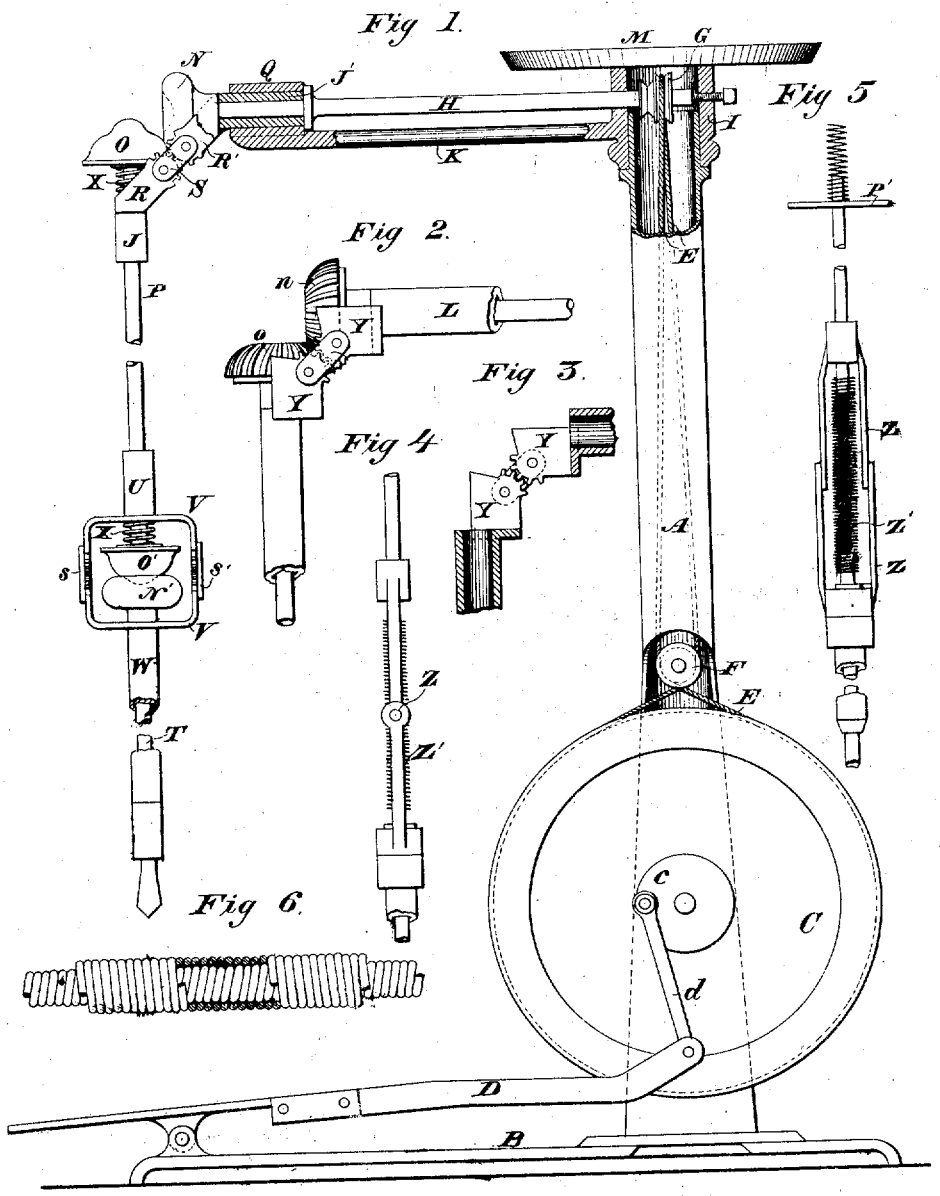
WITNESSES.
Wm A. Stinde
F. Stith
INVENTOR.
Greene V Black.
By his Attorneys
Baldwin Hopkins & Peck

UNITED STATES PATENT OFFICE.

GREENE V. BLACK, OF JACKSONVILLE, ILLINOIS, ASSIGNOR, BY MESNE ASSIGNMENTS, TO SAMUEL S. WHITE, OF PHILADELPHIA, PA.

IMPROVEMENT IN DENTAL DRILLS.

Specification forming part of Letters Patent No. 117,732, dated August 8, 1871; reissue No. 7,452, dated January 2, 1877; application filed November 22, 1876.

*To all whom it may concern:*

Be it known that I, GREENE V. BLACK, of Jacksonville, in the county of Morgan and State of Illinois, have invented certain new and useful Improvements in Dental Engines, of which the following is a specification:

My invention relates to engines of that class in which the tool is driven by power through the intervention of universal-jointed shafting.

The object of the first part of my invention is to drive the tool steadily, notwithstanding its changes of direction relatively to the driving-power; to which end my improvement consists in interposing between different parts of the driving-shaft a driving-spring composed of coils wound in opposite directions, so that as one coil expands under the torsional strain of driving the tool, the other will have a tendency to contract.

My invention further consists in combining, with a driving-spring, a hinged yoke, in which the driving-shaft rotates, the two being in the same plane, whereby the joint is allowed to flex while the longitudinal elongation of the shaft is prevented.

My invention further consists in combining, in a dental-engine, a foot-treadle, a tubular standard or support, driving-belts running through said standard, and an arm swinging around said post to support the jointed driving-connections.

My invention further consists in mounting a table or tray for the reception of tools, &c., upon the top of the upright post of a dental engine.

In the accompanying drawings, Figure 1 represents a view in elevation, partly in section, of a machine such as I propose to employ. Figs. 2 and 3 represent detached views of two shafts connected together by a modified form of gearing and connecting devices. Figs. 4 to 6, inclusive, show other modifications of connecting and driving apparatus.

A hollow post, A, is secured upon any suitable stand or base, B. A foot-treadle, D, pivoted on this base, is connected by a pitman, *d*, to the cranks *c* of a driving-wheel, C, mounted in suitable bearings on the base. A driving-belt, E, passes around the wheel C, and a guide-pulley, F, inside the tubular post A up through said post, and around a pulley, G, on a line-shaft or counter-shaft, H, supported at one end in a cap, I, turning upon the top of the post, and at the other end, in the outer end of a long arm, K, or this arm may, if preferred, be made in the form of a tube, projecting from the cap and enveloping the shaft, as shown in Fig. 2, at L. A table, M, mounted on the top of the cap I, serves to hold tools, &c., used in connection with the apparatus.

In Fig. 1 the outer end of the shaft H is shown as carrying an india-rubber friction-wheel, N, having a concave side and convex face or periphery, and acting upon a convex wheel, O, upon the end of a shaft, P, revolving in bearings in a short tube, J, connected with the bearing Q on the arm K by means of a tube or collar, J′, each collar J J′ being provided with lugs R R′, pivoted together by links S. The shaft P is connected with another shaft, T, by a short tube, U, toothed yokes V V, links S S′, and tube W, the shaft being geared together by wheels N′ O′, similar to those above described. In this case, a coiled spring, X, is arranged between one of the yokes V and the wheel O′, also between the tube or stem J and the wheel O, to press the wheels together to cause sufficient friction to impart rotation to the shaft T which carries burrs or other tools.

The tube W constitutes a handle for guiding the tool, as usual.

Instead of using the lugs R R′ or yokes V V and pivoted links S *s s′*, to connect the bearings of the shafts, I may employ the links and toothed plates or ears Y Y, Figs. 2 and 3; or, instead of the yokes V V, the shafts may be jointed, as in Figs. 4 and 5, where they are connected by the yokes Z, and the adjacent ends of the shafts connected by coiled wires Z′, which will allow them to be turned out of a right line. In this latter case, the shafts may be provided with disks or balance-wheels, P′, Fig. 5, to steady them in case the coils become bent; but to prevent this unsteadiness, I propose to make said coils double, one within the other, the outer one being coiled in one direction, and the other in the opposite direction, so that the resistance operating to coil up the outer one and make it smaller will uncoil the inner one and make it larger. Thus the two will brace each other and prevent the coil twisting upon itself when the resistance is unequal, thereby causing the bit to run steadily, which could not be the case if only a single coil were used. This arrangement of the coiled wire is clearly shown in Fig. 6.

In some cases I may employ toothed wheels *n c*, Fig. 2, instead of the friction-wheels, the teeth being curved across the faces of the wheels to gear properly no matter what angle the shafts may represent, within an angle of ninety degrees, as is well understood.

It will be seen that the shafts P and T may, besides being pointed in any direction, be swung around the axis of the shaft H by the turning of the tube J′ in its bearings Q, to which tube the joint is connected.

The coiled-wire connection also admits of pointing the tools in any direction.

What I claim as of my own invention is—

1. A driving-spring, constructed substantially as hereinbefore set forth, with its coils wound in opposite directions.

2. The combination, substantially as hereinbefore set forth, of the driving-shaft composed of rigid sections united by a coiled spring, and the jointed yokes in which the shaft-sections have their bearings, the joints of the yokes being in the same plane as the spring, to allow both spring and yoke to flex without varying the length of the shaft.

3. The combination, substantially as hereinbefore set forth, of the hollow post, the belt-connections passing therethrough, and a line-shaft mounted upon said post.

4. A tool-tray or table, mounted on the upright post of a dental engine, for the purposes set forth.

5. The dental engine hereinbefore described, consisting of the combination of a base, a treadle, a hollow post mounted on said base, belt-connections passing through said post, a turning cap on said post, a shaft mounted on an arm projecting from said cap, and a universal-jointed driving-shaft connected with said arm.

GREENE V. BLACK.

Witnesses:

A. J. WARD,

GEORGE J. DOD.